(12) United States Patent
Beecher

(10) Patent No.: US 7,363,046 B2
(45) Date of Patent: Apr. 22, 2008

(54) CLEAR CHANNEL ASSESSMENT

(75) Inventor: Phil Beecher, Surrey (GB)

(73) Assignee: Integration UK Ltd., Surrey (GB)

( * ) Notice: Subject to any disclaimer, the term of this patent is extended or adjusted under 35 U.S.C. 154(b) by 485 days.

(21) Appl. No.: 11/131,982

(22) Filed: May 18, 2005

(65) Prior Publication Data

US 2006/0009161 A1 Jan. 12, 2006

(30) Foreign Application Priority Data

Jul. 9, 2004 (GB) ................ 0415452.2

(51) Int. Cl.
 *H04B 7/00* (2006.01)
 *H04Q 7/20* (2006.01)

(52) U.S. Cl. ............ 455/513; 455/522; 455/509; 455/502; 455/69; 455/67.11; 455/67.13; 370/252; 370/318; 370/338; 370/445; 370/447; 370/448

(58) Field of Classification Search ........ 455/450–451, 455/452.1–2, 453, 500, 502, 507, 509, 513, 455/41.1–2, 522, 68–69, 67.11, 13; 370/252, 370/318, 328, 338, 401, 445, 331–332, 447–448, 370/461–462, 465, 496, 241

See application file for complete search history.

(56) References Cited

U.S. PATENT DOCUMENTS

| 6,067,291 A | * | 5/2000 | Kamerman et al. | ......... 370/338 |
| 6,157,616 A | * | 12/2000 | Whitehead | .................. 370/252 |
| 6,922,405 B2 | * | 7/2005 | Eikelenboom et al. | ...... 370/338 |
| 7,155,247 B2 | * | 12/2006 | Busch | ........................ 455/513 |
| 7,173,918 B2 | * | 2/2007 | Awater et al. | .............. 370/332 |

FOREIGN PATENT DOCUMENTS

GB 2229065 A 9/1990

* cited by examiner

*Primary Examiner*—Tuan A. Tran
(74) *Attorney, Agent, or Firm*—Vernon W. Francissen; Francissen Patent Law, P.C.

(57) ABSTRACT

A clear channel assessment procedure is described. The procedure includes setting a threshold value of signal strength. When a message is ready to transmit, the received signal strength intensity (RSSI) is measured, and compared with the threshold. If the received signal strength is less than the threshold value, the message is transmitted, otherwise the system waits before trying again. After a predetermined number of failed attempts the threshold value is increased. The threshold value may be reduced if no acknowledgement is received.

12 Claims, 3 Drawing Sheets

CLEAR CHANNEL ASSESSMENT

FIELD OF INVENTION

The invention relates to a clear channel assessment procedure, i.e. a procedure for determining when a channel is clear for transmission.

RELATED ART

When low power shortrange radios operate there is often a need to deal with a number of transmitters competing to use the same bandwidth. This is true, for example, for transmitters operating in an ism-type band, and in particular for transmitters operating using the Institute of Electrical and Electronic Engineers (IEEE) 802.15.4 protocol.

An ideal system would aim to use the bandwidth co-operatively, to assist other users, but would also avoid degrading system performance or feedback. A clear channel assessment procedure may be adopted to achieve this aim.

Before transmission takes place, the receiver in the device that wishes to transmit is activated to measure the received signal strength intensity (RSSI). This value is compared with a predetermined threshold, and if the measured signal strength is below this threshold the channel is assessed to be clear, and the device transmits, but otherwise the device waits for a random period before repeating the clear channel assessment procedure. After several failures, the device may disregard the clear channel assessment procedure and transmit even without a sufficiently low received signal strength, generally also reporting an error to the user.

This prior art approach has a number of problems. Firstly, in a noisy environment data transmission is always delayed because the device always measures an RSSI value above the threshold. This means that the device always makes several failed attempts before finally transmitting. This delay occurs even if data transfer would be possible, and so the delay reduces the possible data transmission rate.

Secondly, when the device finally transmits, the transmitted message can easily collide with a transmission from another source causing data to be lost both in the device transmitting and in the transmission from the other source.

Thirdly, the threshold is often set high, to reduce the probability that the RSSI value is consistently above the threshold. This has the downside that the device can on occasion determine a "channel clear" result and start transmission even when there is already transmission over the channel.

There is thus a need for an improved channel clear assessment procedure that alleviates these difficulties.

SUMMARY OF INVENTION

According to the invention, there is provided a method of operating a radio, including (a) setting a threshold value of signal strength to be an initial threshold value;

(b) waiting for the radio to have a message to transmit on a channel;

(c) attempting to transmit the message by:

(d) measuring the received signal strength in the channel;

(e) comparing the received signal strength with the threshold value, and (f) if the received signal strength in the channel is less than the threshold value, transmitting the message and reducing the threshold value to the received signal strength plus a predetermined amount; or (g) if the received signal strength is at least the threshold value, waiting for a period of time and repeating from step (c); and (h) increasing the threshold value if the comparison in step (e) determines that the received signal strength is at least the threshold value for a number n of attempts to transmit the message, where n is a positive integer.

When the noise value increases on a channel, the threshold value is accordingly automatically increased. This reduces the probability that subsequent messages are unnecessarily delayed.

Further, the method automatically reduces the threshold value to the received signal strength plus a predetermined value when it transmits. This ensures that when the amount of noise reduces, the threshold reduces for subsequent transmissions.

Thus, the threshold value increases while transmissions are being aborted because the method indicates that the channel is busy, and reduced if transmissions are taking place and failing.

The number n of attempts may in preferred embodiments be predetermined to be 2, 3 or 4. In other embodiments the number n of attempts may vary.

The step of setting the initial threshold value may include:

(a1) measuring the signal strength on the channel a plurality of times over a time period;

(a2) determining the lowest measured value;

(a3) setting the initial threshold value to be the lowest measured value added to a predetermined margin.

In this way the threshold value may be automatically set to a suitable initial value.

The invention is of particular use in an ism band with many unregulated users, and in which interfering radios are enabled and disabled regularly. The method according to the invention can increase throughput and reduce collisions.

Each attempt to transmit the message may include a number of steps measuring the received signal. Accordingly, if in step (e) the received signal strength is less than the threshold value, the method may repeat steps (d) and (e) of measuring the received signal strength in the channel and comparing the received signal strength with the threshold. The steps of transmitting the message and reducing the threshold value to the received signal strength plus a predetermined amount may occur only if the received signal strength remains less than the threshold.

In this way, a message is more likely to be transmitted on a clear channel.

Steps (c) to (g) may carried out by a medium access layer (MAC layer), for example a medium access layer as defined by standard 802.15.4.

The transmission may in particular be half duplex, i.e. transmission on a channel can only take place in one direction at a time. The method may be characterised as a collision avoidance method.

The invention also relates to a computer program arranged to cause a radio to carry out the steps of a method as set up above.

The invention also relates to a radio arranged to operate the method as set out above.

Note that the term "radio" as used in this specification includes any device with a radio transmitter and receiver, including mobile telephone type devices, computers fitted with radio telephony equipment and many other devices, operating on any of a number of radio frequency bands.

BRIEF DESCRIPTION OF DRAWINGS

A specific embodiment of the invention will now be described, purely by way of example, with reference to the accompanying drawings, in which.

DETAILED DESCRIPTION

Figure 1:
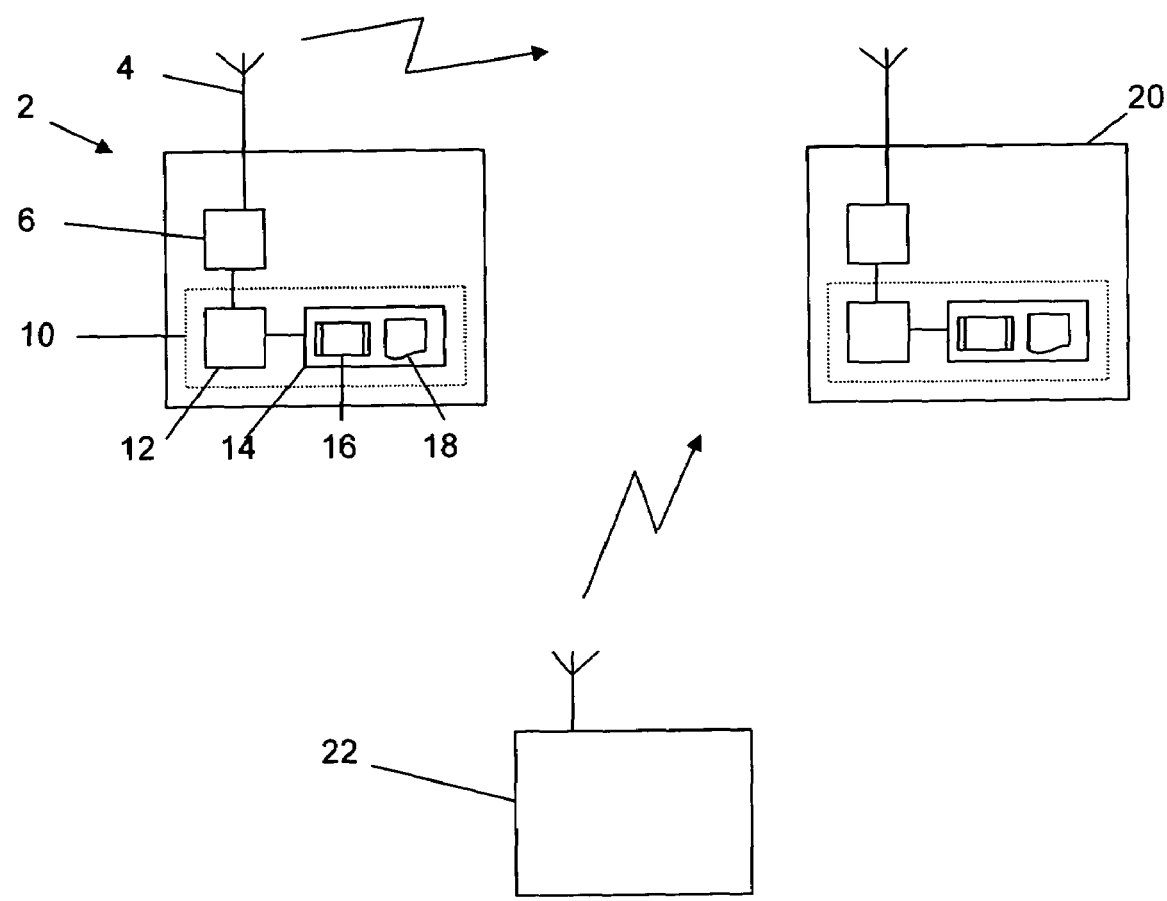
FIG. 1 is a schematic drawing of a pair of radios according to the invention.
Figure 2:
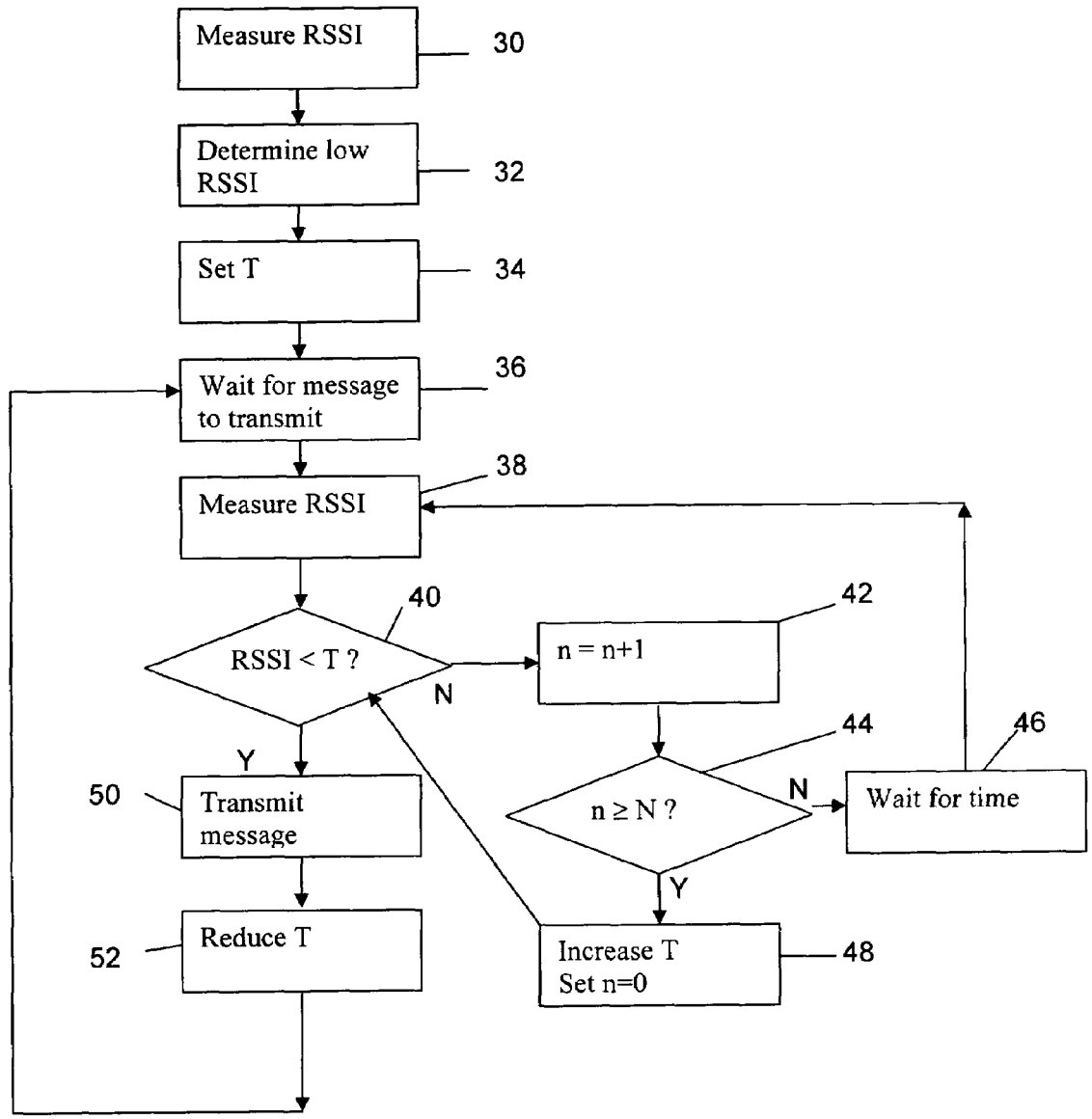
FIG. 2 is a flow diagram of a method according to a first embodiment of the invention.

Referring to FIG. 1, first radio 2 has antenna 4, and transmitting and receiving circuitry 6. In the specific embodiment the radio 2 is arranged for half duplex transmission, i.e. the radio can transmit or receive on a channel, but not both at the same time. Accordingly, the transmitting and receiving circuitry 6 may have components shared between transmission and reception.

Control circuitry 10 controls the radio 2 and is shown schematically with a processor 12, and memory 14, connected to the transmitting and receiving circuitry 6. In the specific embodiment, the transmission is half-duplex i.e. the radio can transmit or receive on a channel, but cannot transmit and receive simultaneously on the channel.

Memory 14 contains code 16 for causing the radio 2 to operate in a manner as set out below. Data storage 18 is also provided, and includes the values of T, n, N etc. as set out below.

Second radio 20 is also shown. In the example, it has the same components as the first radio though this is not essential.

Other transmitters that may also use the channel are represented schematically by interfering transmitter 22.

In use, transmission between first radio 2 and second radio 20 on a channel is carried out using the following steps.

Firstly (step 30) radio 2 measures the received signal strength intensity (RSSI) on the channel a number of times, for example in the range three to thirty, over a time period such as several seconds or minutes. Then (step 32) the radio determines the lowest RSSI measured, and sets (step 34) the initial threshold value T to be the lowest measured value plus a predetermined margin.

The radio 2 now waits (step 36) until it has a message to transmit. Next, the receiving circuitry measures (step 38) the RSSI value on the channel and compares (step 40) the received RSSI value with the threshold value T. Initially, this threshold value will be the initial threshold value but this may change subsequently as set out below. By waiting until a message is ready to transmit the preferred embodiment reduces processing load during idle times. This is particularly beneficial in apparatus that is powered by a battery.

If the received signal strength is at least the threshold value T, the channel is determined to be busy. It is assumed that this is likely to be because another transmitter 22 is using the channel. The system increments a loop counter n (step 42), checks (step 44) whether the loop counter has reached a predetermined value N and if not waits (step 46) for a period of time determined in a pseudo-random way. Then, the system repeats from step 38.

If the loop counter n reaches the predetermined value in step 42, then the threshold value is determined to be too low, and is incremented (step 48). The loop counter is reset and processing continues from comparison step 40.

If in step 40 the RSSI value is less than the threshold value the channel is determined to be clear and the message is transmitted (step 50) by the transmitter to the second radio 20. At this time the loop counter n is also zeroed, and further the threshold value T is reduced to the measured RSSI value plus a predetermined offset (step 52). The radio can then wait for the next message to be ready to transmit (step 36).

By increasing the threshold value when transmissions are being aborted because the channel is never clear and reducing it when the channel is clear the threshold value adapts to a suitable value for the environment of the radio 2.

Note in particular that unlike in the prior art case the system never simply ignores the clear channel assessment procedure. Instead, the system increases T to a value steadily until transmission can take place, so ensuring that even in noisy environments good transmission times are chosen.

As a modification of this embodiment, the radio 20 may transmit an acknowledgement message ACK back to radio 2 if the message is successfully received at radio 20. Radio 2 may track these acknowledgement messages, and the number of messages for which no ACK is received may be used as a measure of data link integrity. If too many messages are not acknowledged, this may trigger radio 2 to recalibrate the threshold T by starting the method again from step 30.

The radios 2, 20 may be any suitable radio, especially transmitting on the ism bands defined by the International Telecommunications Union (ITU), for example for Bluetooth or Wi-Fi communications. Thus the radios may typically for example be computers, especially laptops or personal digital assistants (PDAs).

The invention is particularly suitable for use in dynamically adjusting radio transmission in noisy environments in which the noise floor varies.

Figure 3:
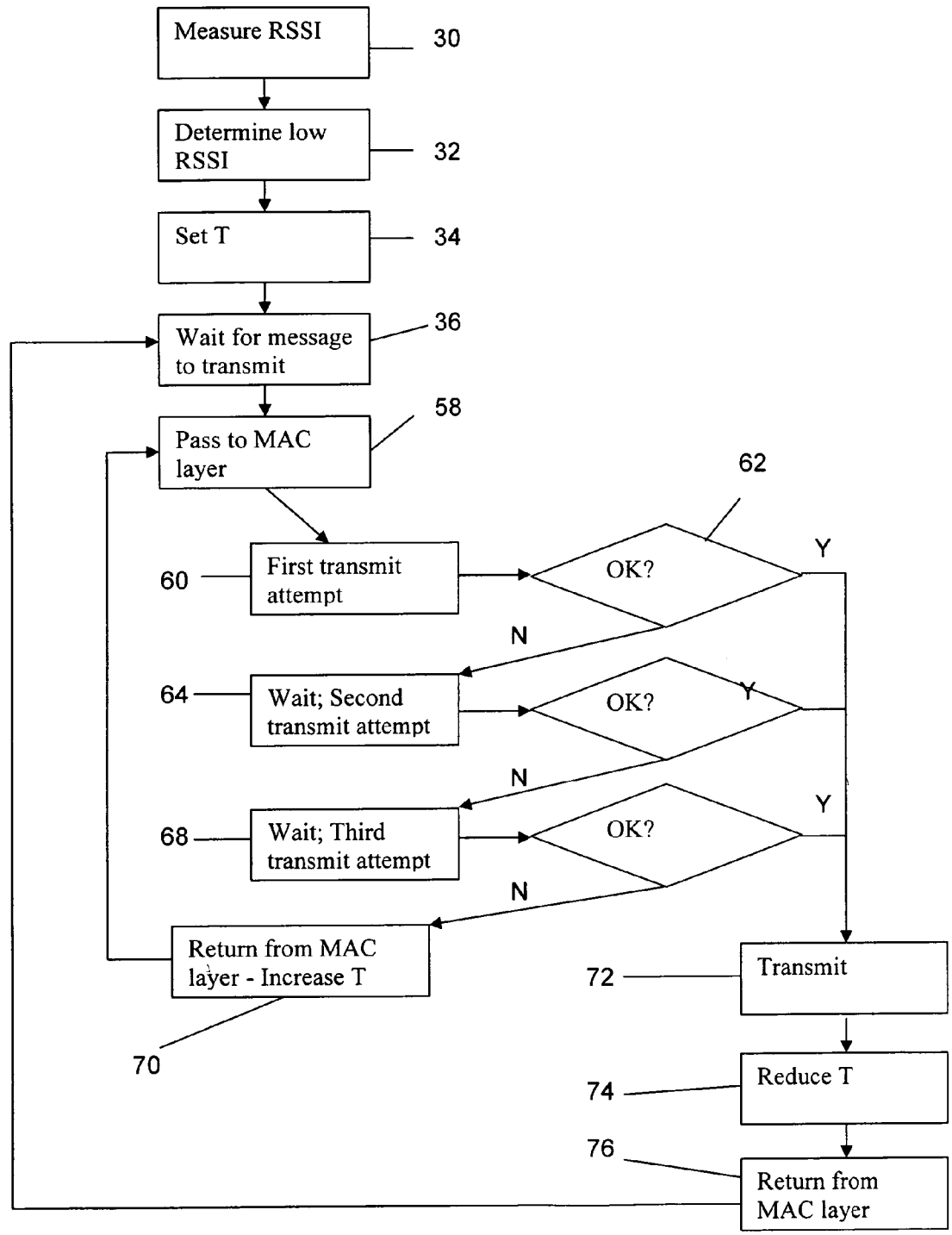
FIG. 3 is a flow diagram of a method according to a second embodiment of the invention.

In a particularly preferred embodiment the invention is applied to an 802.15.4 stateful packet inspection (SPI) interface, as will now be described with reference to FIG. 3.

The IEEE standard mandates some features, and especially some features of the underlying MAC layer.

The initial steps proceed as in the second embodiment. When a message is ready to transmit (step 36) the system calls the underlying MAC layer (step 58).

The underlying MAC layer makes a first attempt to transmit the message (step 60) by measuring signal strength, and if the received signal strength is less than a predetermined threshold measures the signal strength again a predetermined time later. If the received signal strength remains less than the threshold then transmission begins (step 72).

If either of the attempts fails, the MAC layer backs off by a random time and then makes a second attempt to transmit the message (step 64), again by carrying out the steps of measuring signal strength, and if the received signal strength is less than a predetermined threshold measuring the signal strength again a predetermined time later. If the received signal strength remains less than the threshold then transmission begins.

If the second attempt fails, the MAC layer backs off again by a random time and makes a third attempt (step 68), repeating the steps of measuring signal strength, and if the received signal strength is less than a predetermined threshold measuring the signal strength again a predetermined time later. If the received signal strength remains less than the threshold then transmission begins.

If the third transmission attempt fails, the MAC layer reports a failure to the next layer up.

It is at this point (step 70) that the method according to the invention increases the threshold by a predetermined amount, backs off (i.e. waits) for a predetermined time, before trying again by passing the transmission request to the MAC layer which tries again to transmit using the new threshold, again making three attempts before reporting failure.

The various backoffs may in a preferred embodiment be of the form $2^i-1$ time units, where i is any positive integer. Thus, the backoffs may be 3, 7 or 15 time units, for example.

After transmission occurs (step 72), the MAC layer replaces the threshold value T with the lower of the two measured RSSI values of the attempt step (60, 64, 68) that resulted in transmission, plus a small, predetermined offset. Then, the MAC layer passes control to the next layer up (step 76) to wait for transmission of the next message (step 36).

In a variation of the above, the layer above the MAC layer can pass control to the MAC layer with a given value of T for a number of times before incrementing the value of T.

It is assumed in the foregoing that the transmission will take place on a predetermined channel but the skilled person will realise that the invention is also applicable in multi-channel situations in which a clear channel assessment is carried out on a number of channels. In this case, a single threshold value may be used for all channels which has the advantage that the receiver does not need to listen on all channels at once. Alternatively, different threshold values may be obtained in the above manner for each channel. This latter approach has the benefit that the threshold value gives a measure of the noise level on each channel and can be used to select between channels.

The payload type and capacity may be determined by the underlying transport layer and the invention may be used with any payload type, including single bytes or long messages.

The invention is particularly suitable for use with low power transmitters and receivers.

I claim:

1. A method of operating a radio, the method including:
   (a) setting a threshold value of signal strength to be an initial threshold value;
   (b) waiting for the radio to have a message to transmit on a channel;
   (c) attempting to transmit the message by:
     (d) measuring the received signal strength on the channel;
     (e) comparing the received signal strength with the threshold value, and
     (f) if the received signal strength in the channel is less than the threshold value, transmitting the message and reducing the threshold value to the received signal strength plus a predetermined amount; or
     (g) if the received signal strength is at least the threshold value, waiting for a period of time and repeating from step (c); and
   (h) increasing the threshold value if the comparison in step (e) determines that the received signal strength is at least the threshold value for a number n of attempts to transmit the message, where n is a positive integer.

2. The method according to claim 1, wherein step (a) of setting the initial threshold value includes:
   (a1) measuring the signal strength on the channel a plurality of times over a time period;
   (a2) determining the lowest measured value;
   (a3) setting the initial threshold value to be the lowest measured value added to a predetermined margin.

3. The method according to claim 1, wherein each attempt to transmit the message includes:
   if in step (e) the received signal strength is less than the threshold value repeating steps (d) and (e) of measuring the received signal strength in at least one channel and comparing the received signal strength with the threshold;
   and transmitting the message and reducing the threshold value to the received signal strength plus a predetermined amount only if the received signal strength remains less than the threshold.

4. The method according to claim 1, wherein the number n of attempts is predetermined to be 2, 3 or 4.

5. The method according to claim 1, wherein steps (c) to (g) are carried out by a medium access layer.

6. The method according to claim 1, wherein the transmitting step uses half duplex transmission.

7. A radio, comprising:
   a transmitter and receiver for transmitting and receiving in one or more channels;
   a control processor for controlling the transmitter and receiver, wherein the control processor includes code arranged to cause the radio to carry out the steps of:
   (a) setting a threshold value of signal strength to be an initial threshold value;
   (b) waiting for the radio to have a message to transmit;
   (c) attempting to transmit the message by:
     (d) measuring the received signal strength on at least one channel;
     (e) comparing the received signal strength with the threshold value, and
     (f) if the received signal strength on the at least one channel is less than the threshold value, transmitting the message and reducing the threshold value to the received signal strength plus a predetermined amount; or
     (g) if the received signal strength is at least the threshold value, waiting for a period of time and repeating from step (c); and
   (h) increasing the threshold value if the comparison in step (e) determines that the received signal strength is at least the threshold value for a number n of attempts to transmit the message, where n is a positive integer.

8. The radio according to claim 7, wherein the radio is an ISM band radio.

9. The radio according to claim 7, wherein the code is arranged to cause the radio to carry out the step (a) of setting the initial threshold value using the sub-steps of:
   (a1) measuring the signal strength on the at least one channel using the receiver a plurality of times over a time period;
   (a2) determining the lowest measured value;
   (a3) setting the initial threshold value to be the lowest measured value added to a predetermined margin.

10. The radio according to claim 7, wherein the code is arranged to cause the radio in each attempt to transmit the message to carry out the steps of:
    if in step (e) the received signal strength is less than the threshold value repeating steps (d) and (e) of measuring the received signal strength on the at least one channel and comparing the received signal strength with the threshold;
    and transmitting the message and reducing the threshold value to the received signal strength plus a predetermined amount only if the received signal strength remains less than the threshold.

11. The radio according to claim 7, wherein the transmitter and receiver are half duplex.

12. A computer program product comprising a computer readable storage structure embodying computer program code thereon for execution by a processor in a radio that enables the radio to perform the steps of:
- (a) setting a threshold value of signal strength to be an initial threshold value;
- (b) waiting for the radio to have a message to transmit on a channel;
- (c) attempting to transmit the message by:
  - (d) measuring the received signal strength on the channel;
  - (e) comparing the received signal strength with the threshold value, and
  - (f) if the received signal strength in the channel is less than the threshold value, transmitting the message and reducing the threshold value to the received signal strength plus a predetermined amount; or
  - (g) if the received signal strength is at least the threshold value, waiting for a period of time and repeating from step (c); and
- (h) increasing the threshold value if the comparison in step (e) determines that the received signal strength is at least the threshold value for a number n of attempts to transmit the message, where n is a positive integer.

* * * * *